United States Patent [19]  [11] 3,960,719
Bresson  [45] June 1, 1976

[54] COALESCENCE FILTER FOR OIL-WATER DISPERSIONS

[75] Inventor: Clarence R. Bresson, Bartlesville, Okla.

[73] Assignee: Phillips Petroleum Company, Bartlesville, Okla.

[22] Filed: Dec. 6, 1973

[21] Appl. No.: 422,317

[52] U.S. Cl. ............................... 210/23 R; 210/508
[51] Int. Cl.² .......................................... B01D 13/00
[58] Field of Search ............... 210/23, 505, 508 CD

[56] References Cited
UNITED STATES PATENTS

| | | |
|---|---|---|
| 3,019,904 | 2/1962 | Stecher ............................ 210/23 X |
| 3,096,204 | 7/1963 | Spangler et al. ............... 210/DIG. 5 |
| 3,229,817 | 1/1966 | Pall ............................... 210/DIG. 5 |
| 3,645,398 | 2/1972 | Fiollo .................................. 210/73 |
| 3,794,583 | 2/1974 | Rhodes ............................... 210/23 |
| 3,796,659 | 3/1974 | Jones et al. ................... 210/DIG. 5 |

*Primary Examiner*—Frank A. Spear, Jr.

[57] ABSTRACT

A filtering medium composed of a fabric made from an oleophilic fiber-forming polymer and having a high ratio of surface area to unit weight is used in coalescing oil dispersed in water thereby facilitating separation of oil droplets dispersed in water. In one embodiment a capcoated, nonwoven polypropylene fabric provides an excellent coalescing medium.

6 Claims, 1 Drawing Figure

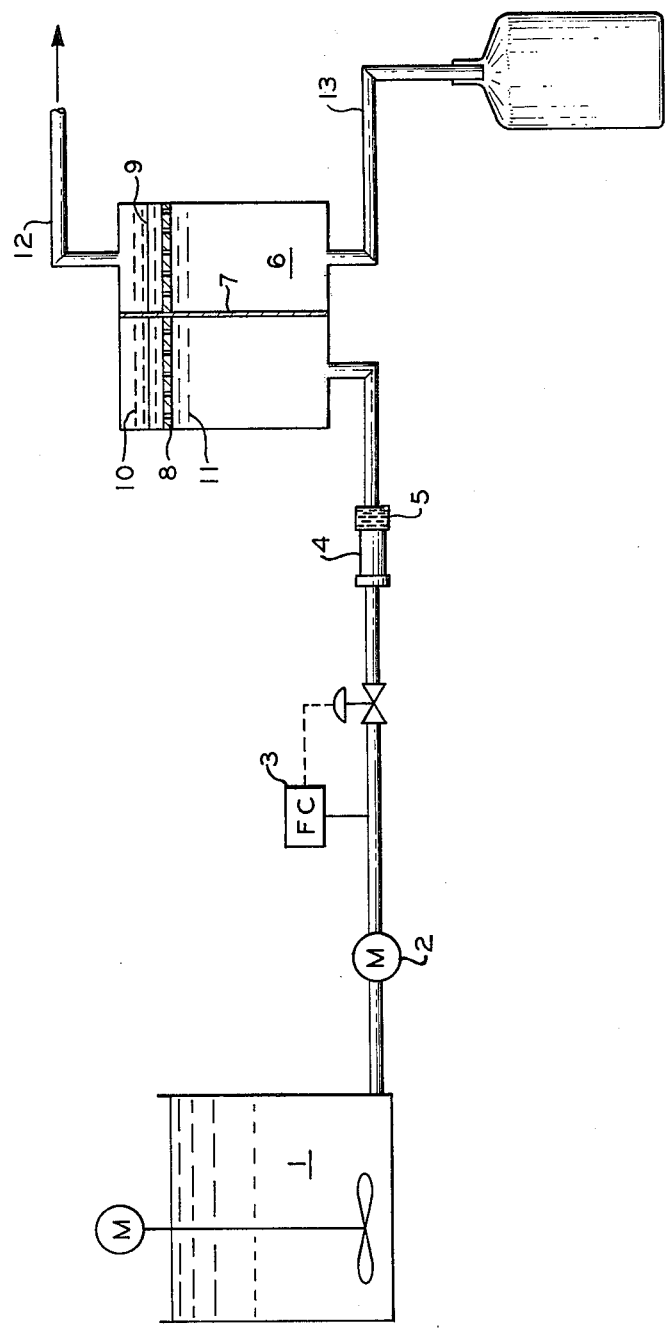

COALESCENCE FILTER FOR OIL-WATER DISPERSIONS

BACKGROUND OF THE INVENTION

This invention relates to processes for filtering. In one of its aspects this invention relates to coalescing oil droplets dispersed in a water phase. In another of its aspects, this invention relates to a method for separating dispersions of oil in water. In yet another of its aspects this invention relates to oleophilic filtering media.

In one of its concepts this invention relates to the agglomeration of oil droplets dispersed in a water phase by passage of a mixture of oil droplets in water through a filtering medium which will agglomerate the oil droplets into masses of oil of sufficient size to facilitate separation of the oil and water.

Ballast water in water tankers and bilge water from oil fired ships are frequently contaminated with residual oil which may form a stable emulsion. In the past such waste water was discharged directly into the ocean or seaways. Our realization of the importance of the prevention of environmental pollution has caused the seeking of ways to substantially reduce or eliminate the discharge of oily residue from ships.

One of the methods through which a cleaner environment has been sought is by filtering oily water residue before discharge of the water into the environment. Filter units through which discharged water is pumped have been installed in a number of ships. Since a filtering system is no better than the filtering medium used in the system considerable work has been done to establish workable media for removing dispersed oil from water. Experimental data, evaluated visually, has shown that oleophilic, nonwoven fabric has excellent properties for coalescing dispersed oil from water mixtures.

It is therefore an object of this invention to provide filtering media for the removal of oil dispersed in a water phase. It is another object of this invention to provide a method for agglomerating or coalescing oil dispersed in water mixtures. It is a further object of this invention to provide a method for separating oil and water from an oil dispersion in a water phase.

Other aspects, objects and the advantages of this invention will be apparent to one skilled in the art upon studying the specification, drawing and the appended claims.

STATEMENT OF THE INVENTION

In accordance with the invention, a fabric made of an oleophilic, fiber-forming polymer having a high ratio of surface area to unit weight is used as the filtering medium through which is passed a mixture of oil droplets dispersed in a water phase thereby agglomerating the oil into sufficiently large drops that they will separate from the water phase to form a separate oil phase.

In one embodiment of the invention a method is provided for removing oil from a mixture comprising oil dispersed in water by coalescing the oil droplets by passage through a suitable filter medium, allowing the coalesced oil droplets to collect as a separate phase and removing the water and oil as separate streams.

The data tabulated below in the example will serve to illustrate the effectiveness of a polypropylene fabric as an agglomerating filter for oil dispersed in a water phase. From the data it has been determined that the most desirable agglomeration results are given by a structured material with a large surface area per unit weight made of an oleophilic material. It seems apparent that the absorption of oil from the water on the oleophilic surface of the fabric facilitates the formation of oil droplets. A fabric constructed of a water wettable fiber, even if it absorbs oil when immersed therein, will be less effective when a small amount of oil is to be removed from a large quantity of water. This suggests that other hydrophobic, oleophilic materials should be equally effective provided a fabric with a large surface area per unit weight can be made therefrom. Generally, polyolefins are such materials. Suitable polyolefins include polyethylene, polypentene, copolymers of ethylene and propylene, ethylene and hexene and the like. Fibers from the polyfluorocarbons, such as polytetrafluoroethylene, can also be used to make suitable fabrics. Mixtures of oleophilic fibers are also suitable for use in this invention.

The data also suggests that although a nonwoven fabric comprising a needled bat of carded fibers forms a basis for the experimental data, any method of producing a coherent fabric, such as weaving, should be suitable for the invention as long as the fabric produced has a high ratio of surface area to unit weight. The fabric will be used in multiple thicknesses in constructing a filter element using individual strata of 30–100 mils in thickness with from about three to about 25 such strata layered to form a final thickness that will be at least 0.5 inch. In a preferred embodiment a nonwoven fabric comprising a needled bat of carded polypropylene fibers fused on one side only and capcoated with an additional layer of polypropylene fibers needle punched into the unfused side was tested as a coalescing agent suitable for this invention. A similar material known as "Petromat", a nonwoven fabric of polypropylene fibers, is available from Phillips Fibers Corporation, Greenville, S.C. Petromat fabric has a weight of about 4–6 ounces per square yard, a tensile strength in the "warp" direction of 80–90 pounds and a tensile strength in the fill or "woof" direction of about 90–100 pounds. The fabric tested had a weight of 3–7 ounces per square yard and an uncompressed thickness of 30–100 mils per layer.

For the test from 3–21 such thicknesses were used. Generally, from about 3 to about 25 thicknesses of fabric would be useful in constructing a filter for the process of this invention. The final thickness of a suitable filter structure can vary from about 0.5 to about 3 inches of multi-plied thickness.

The process of the invention can be best understood in conjunction with the drawing which illustrates a coalescent filter simulator apparatus which was constructed for use in testing the effectiveness of coalescing filters of this invention. Referring now to the drawing, oily water at 5,000 ppm oil concentration in 3% salt water (simulated seawater) was prepared in the holding tank 1 using an air-driven stirrer for mixing. A small centrifugal pump 2 was used to pump oily water through the system. The amount of mixture was held to a controlled amount by a flow controller 3. This pump tended to further disperse the oil in the water making separation more difficult. A 2-inch diameter metal mesh pressure filter 4 was used to hold the coalescing agents 5 to be tested. The oily water mixture after going through the filter, then passed through a baffled separator 6 where the oil could separate if sufficient coalescence has occurred. The baffle 7 tends to slow the flow sufficiently to allow the agglomerated oil to separate and pass through a perforated plate 8 where further agglomeration takes place and at interface 9 form two separate layers of oil 10 and water 11 which can be removed by separate lines 12 and 13.

A commercial oily water separator handles 10 gal/min through a 3.5 inch inside diameter × 12 inch long filter. This reduces a 300 ml/min/sq.in. of filter surface or approximately 940 ml/min for a 2-inch diameter disk mounted in the coalescing unit. The flow rate through the test set-up was controlled at 900–1000 ml/min for each run. Tests were made using both tap water and 3% salt water containing Ekofisk North Sea crude.

The following materials were tested:
1. A loose nonwoven fabric of poly(ethylene terephthalate) from a commercial oil-water separator unit. A 2 inch segment was cut from the filter which had 10 layers of material and a thickness of 1½ inch, uncompressed.
2. Loose polypropylene fibers.
3. Capcoated 4.2 oz/sq.yd. nonwoven polypropylene fabric (Petromat made by Phillips Fibers Corporation) heat sealed on one side. In the test the fused side of each layer was on the downstream side.

The surface area of the commercial filter fibers, the loose polypropylene fibers and the Petromat fabric was calculated from measured average fiber diameters. Oil coalescence tests were then conducted with the loose polypropylene fibers and Petromat fabric with surface areas equivalent to commercial filter, then with fiber weights equivalent to the commercial filter and finally with fabric thickness equivalent to commercial filter. Petromat fabric (three layers) at a surface area equivalent to commercial filter (10 layers) did a better job of oil coalescence and oil separation but the effluent water was still colored. When the Petromat fabric was increased (eight layers) to a weight equivalent to commercial filter, oil coalescence and separation was good and the effluent water had only a tinge of color. With Petromat fabric at the same thickness (21 layers) as the commercial filter oil coalescence and separation were excellent. The slight haze left was attributed to an emulsion being formed by shearing action of the centrifugal pump when the flow is throttled down.

The commercial filter gave at best only slight oil coalescence as only an occasional droplet was observed; there was very little oil separation and the effluent oil-water dispersion was dark brown in color. The fluted paper filter gave only slightly better results. Some oil droplets were observed and there was a small amount of oil separation; but the effluent water from the separator was dark brown in color.

The tests with loose polypropylene fibers at either equivalent surface area or equivalent weight to commercial filter gave coalescence about equivalent to commercial filter and certainly no better. Upon opening the coalescing unit it was found with both commercial filter and polypropylene fiber filters that oil had accumulated in small pools throughout the fabric network.

TABLE I

COMPARISONS OF FILTERS FOR OIL COALESCENCE

|  | Commercial Filter | Petromat$^R$ Fabric | Polypropylene Fiber |
|---|---|---|---|
| Avg. Fiber Diameter | 0.0051 cm | 0.00255 cm | 0.0051 cm |
| Diameter Mils | 2 mil | 1 mil | 2 mil |
| Polymer | PET* | Polypropylene | Polypropylene |
| Denier g/9000 m | 25 | 4 | 16 |
| Surface Area cm$^2$/g | 577 | 1803 | 901 |

TABLE I-continued

COMPARISONS OF FILTERS FOR OIL COALESCENCE

| Filter | Form | Wt. g | Calculated Surface Area, cm$^2$ | Coalescence |
|---|---|---|---|---|
| Commercial Filter | 10 Layers | 2.95 | 1700 | Poor |
| Polypropylene Fibers | loose | 1.80 | 1700 | Poor |
| Petromat$^R$ Fabric | 3 layers | 0.95 | 1700 | Fair |
| Polypropylene Fibers | loose | 2.95 | 2660 | Poor |
| Petromat$^R$ Fabric | 8 layers | 2.95 | 5300 | Good |
| Petromat$^R$ Fabric | 21 layers | 7.9 | 14300 | Excellent |

*Poly(ethyleneterephthalate)

The data indicate that for a given surface area, the polypropylene fabric shows improved performance and that on a weight for weight comparison, polypropylene fabric was definitely superior. Whatever basis was used for the comparative test of a commercial filter with the capcoated polypropylene fabric, the latter showed improved performance. The data also indicate the effectiveness of the polypropylene fabric, as compared in the runs using various thicknesses of that material, as a coalescing agent for oil droplets in a water phase.

It is also indicated that materials suitable for a filter fabric of this invention should have a ratio of surface area to unit weight of at least 1200 cm$^2$/g. Preferably, the fabric should have a ratio of surface area to unit weight in the range of about 1500 to about 2100 cm$^2$/g. The upper limitation of this range is suggested as a practical limit, whereas the lower limit is considered close to the working limit.

Reasonable variation and modification are possible within the scope of the foregoing disclosure, the drawing and the appended claims of the invention the essence of which is that there has been provided a fabric filter element suitable for agglomerating oil droplets from a water phase in a coalescing filter which can be used in a process for separating oil from a mixture of oil dispersed in water.

I claim:
1. A method for agglomerating oil dispersed in water, said method comprising passing a mixture of oil dispersed in water through a coalescing filter, said filter comprising from about three to about 25 strata of about 30 to about 100 mils in thickness for a total thickness of at least 0.5 inch of polypropylene fibers needled to produce a coherent fabric fused on one side only and capcoated with an additional layer of polypropylene fibers needle punched into the unfused side.

2. A method of claim 1 wherein said fabric has a ratio of surface area to unit weight of at least 1200 cm$^2$/g.

3. A method of claim 2 wherein said fabric has a ratio of surface area to unit weight in the range of about 1500 to about 2100 cm$^2$/g and is of a total filter thickness in the range of about 0.5 to about 2 inches.

4. A method for removing oil from a mixture comprising dispersed oil in water said method comprising:
   a. agglomerating at least a portion of said dispersed oil by the method of claim 1,
   b. allowing coalesced oil droplets to collect as a phase separate from the filtered water, and
   c. removing the water and the oil as separate streams.

5. A coalescing filter comprising from about three to about 25 strata of about 30 to about 100 mils in thickness for a total thickness of at least 0.5 inch of polypropylene fiber needled to produce a coherent fabric having a ratio of surface area to unit weight of at least 1200 cm$^2$/g and each stratum fused on one side only and capcoated with an additional layer of polypropylene fibers needle punched into the unfused side.

6. A filter of claim 5 wherein said fabric has a ratio of surface area to unit weight in the range of about 1500 to about 2100 cm$^2$/g and a total filter thickness in the range of about 0.5 to about 2 inches.

* * * * *